US008218512B2

(12) United States Patent
Yaqub (10) Patent No.: US 8,218,512 B2
(45) Date of Patent: Jul. 10, 2012

(54) DISTRIBUTION OF SESSION KEYS TO THE SELECTED MULTIPLE ACCESS POINTS BASED ON GEO-LOCATION OF APS

(75) Inventor: Raziq Yaqub, Stewartsville, NJ (US)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 542 days.

(21) Appl. No.: 11/694,983

(22) Filed: Mar. 31, 2007

(65) Prior Publication Data

US 2008/0031194 A1    Feb. 7, 2008

Related U.S. Application Data

(60) Provisional application No. 60/804,737, filed on Jun. 14, 2006.

(51) Int. Cl.
*H04W 4/00* (2009.01)
(52) U.S. Cl. ............. 370/338; 455/436; 455/456.1; 455/410; 455/411; 370/331
(58) Field of Classification Search ........... 370/352, 370/331, 338, 328; 455/436, 456.1
See application file for complete search history.

(56) References Cited

U.S. PATENT DOCUMENTS

| | | | |
|---|---|---|---|
| 2002/0131386 A1 | 9/2002 | Gwon | |
| 2003/0061351 A1* | 3/2003 | Prathima et al. | 709/226 |
| 2004/0203783 A1 | 10/2004 | Wu et al. | |
| 2004/0240412 A1* | 12/2004 | Winget | 370/331 |
| 2004/0249915 A1* | 12/2004 | Russell | 709/223 |
| 2007/0281712 A1* | 12/2007 | Povey et al. | 455/456.1 |
| 2009/0122748 A1* | 5/2009 | Gourhant et al. | 370/328 |
| 2009/0282238 A1* | 11/2009 | Bichot et al. | 713/155 |

FOREIGN PATENT DOCUMENTS

| | | |
|---|---|---|
| EP | 1439667 A2 | 7/2004 |
| EP | 1531645 A1 | 5/2005 |
| WO | 01/58182 A2 | 8/2001 |
| WO | WO2005/107309 A1 | 11/2005 |

OTHER PUBLICATIONS

International Preliminary Report, Dec. 31, 2008, pp. 1-4.
International Search Report dated Feb. 14, 2008.
European Office Action dated Dec. 19, 2011, issued in corresponding European Patent Application No. 07809570.0-2413.

(Continued)

*Primary Examiner* — Anthony Addy
*Assistant Examiner* — Shahriar Behnamian
(74) *Attorney, Agent, or Firm* — Westerman, Hattori, Daniels & Adrian, LLP (57) ABSTRACT

In the public WLAN systems, reliable user re-authentication for mobility support is an essential step. However, re-authentication during handoff procedures causes long handoff latency which deteriorates the quality of service specifically for real-time multimedia applications. One possible solution is to authenticate the Mobile Node (MN) in advance with all the neighboring Access Points (APs) and distribute the Session Keys to them. However, the key issue is how to optimally and efficiently select the neighboring APs. In the preferred embodiments, we propose a system that takes into account the user current "Geo-Location", "Mobility Pattern" and "Application Running on MN"; estimates the "Expected Mobility Zone" (EMZ) and selects an appropriate set of candidate APs corresponding to the MN's geo-location. The EMZ may comprise of APs belonging to "Intra-domain", "Inter-domain" or "Inter-technology Networks" (e.g., WLAN, WiMAX, and Cellular etc). The system assumes that not only the Mobile Nodes but also the Fixed Nodes (APs or Base Stations) are capable of knowing their Geo-Location Coordinates X, Y, Z. This capability may come either by integrating GPS receiver or through any other alternate, state of the art or future positioning technologies in the APs.

24 Claims, 4 Drawing Sheets

OTHER PUBLICATIONS

Canadian Office Action dated Oct. 4, 2011, issued in corresponding Canadian Patent Application No. 2,656,029.

European Search Report dated Oct. 26, 2011, issued in corresponding European Patent Application No. 07809570.0.

* cited by examiner

DISTRIBUTION OF SESSION KEYS TO THE SELECTED MULTIPLE ACCESS POINTS BASED ON GEO-LOCATION OF APS

The present application claims priority under 35 U.S.C. 119 to U.S. provisional patent application Ser. No. 60/804,737, to R. Yaqub, filed on Jun. 14, 2006, entitled Distribution Of Session Keys to the Selected Multiple Access Points (APs) Based On Geo-Location Of APs.

BACKGROUND

1. Field of the Invention

The present application relates to wireless communications and in particular to, inter alia, methods and systems for Distribution of Session Keys to the Selected Multiple Access Points (APs) Based on Geo-Location of APs.

2. Background Discussion

Networks and Internet Protocol:

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, etc. Each host device on the network has at least one IP address that is its own unique identifier. IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router, or a workstation. Messages destined for some other host are not passed up to the upper layers but are forwarded to the other host. The layers of the OSI model are listed below. Layer 7 (i.e., the application layer) is a layer at which, e.g., communication partners are identified, quality of service is identified, user authentication and privacy are considered, constraints on data syntax are identified, etc. Layer 6 (i.e., the presentation layer) is a layer that, e.g., converts incoming and outgoing data from one presentation format to another, etc. Layer 5 (i.e., the session layer) is a layer that, e.g., sets up, coordinates, and terminates conversations, exchanges and dialogs between the applications. Layer-4 (i.e., the transport layer) is a layer that, e.g., manages end-to-end control and error-checking, etc. Layer-3 (i.e., the network layer) is a layer that, e.g., handles routing and forwarding, etc. Layer-2 (i.e., the data-link layer) is a layer that, e.g., provides synchronization for the physical level does bit-stuffing and furnishes transmission protocol knowledge and management, etc. The Institute of Electrical and Electronics Engineers (IEEE) sub-divides the data-link layer into two further sub-layers, the MAC (Media Access Control) layer that controls the data transfer to and from the physical layer and the LLC (Logical Link Control) layer that interfaces with the network layer and interprets commands and performs error recovery. Layer 1 (i.e., the physical layer) is a layer that, e.g., conveys the bit stream through the network at the physical level. The IEEE sub-divides the physical layer into the PLCP (Physical Layer Convergence Procedure) sub-layer and the PMD (Physical Medium Dependent) sub-layer.

Wireless Networks:

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANs) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address, and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card that may include an antenna, By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (e.g. outside mobile IP), routing mechanisms rely on the assumptions that each network node always has a constant attachment point to, e.g., the Internet and that each node's IP address identifies the network link to which it is attached. In this document the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

SUMMARY OF THE INVENTION

The present invention improves upon the above and/or other background technologies and/or problems therein.

In the public WLAN systems, reliable user re-authentication for mobility support is an essential step. However, re-authentication during handoff procedures causes long handoff latency which deteriorates the quality of service specifically for real-time multimedia applications. One possible solution is to authenticate the Mobile Node (MN) in advance with all the neighboring Access Points (APs) and distribute the Session Keys to them. However, a notable issue is how to optimally and efficiently select the neighboring APs. In the preferred embodiments, we propose a system that takes into account the user current "Geo-Location", "Mobility Pattern" and "Application Running on MN"; estimates the "Expected Mobility Zone" (EMZ) and selects an appropriate set of candidate APs corresponding to the MN's geo-location. The EMZ may comprise of APs belonging to "Intra-domain", "Inter-domain" or "Inter-technology Networks" (e.g., WLAN, WiMAX, and Cellular, etc). In this system, not only the Mobile Nodes but also the Fixed Nodes (APs or Base Stations) are capable of knowing their Geo-Location Coordinates X, Y, Z. This capability may come either by integrating GPS receiver or through any other alternate, state of the art or future positioning technologies in the APs.

The above and/or other aspects, features, and/or advantages of various embodiments will be further appreciated in view of the following description in conjunction with the accompanying figures. Various embodiments can include and/or exclude different aspects, features, and/or advantages where applicable. In addition, various embodiments can combine one or more aspect or feature of other embodiments where applicable. The descriptions of aspects, features, and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which.

DISCUSSION OF THE PREFERRED EMBODIMENTS

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

Illustrative Architecture

Figure 1:
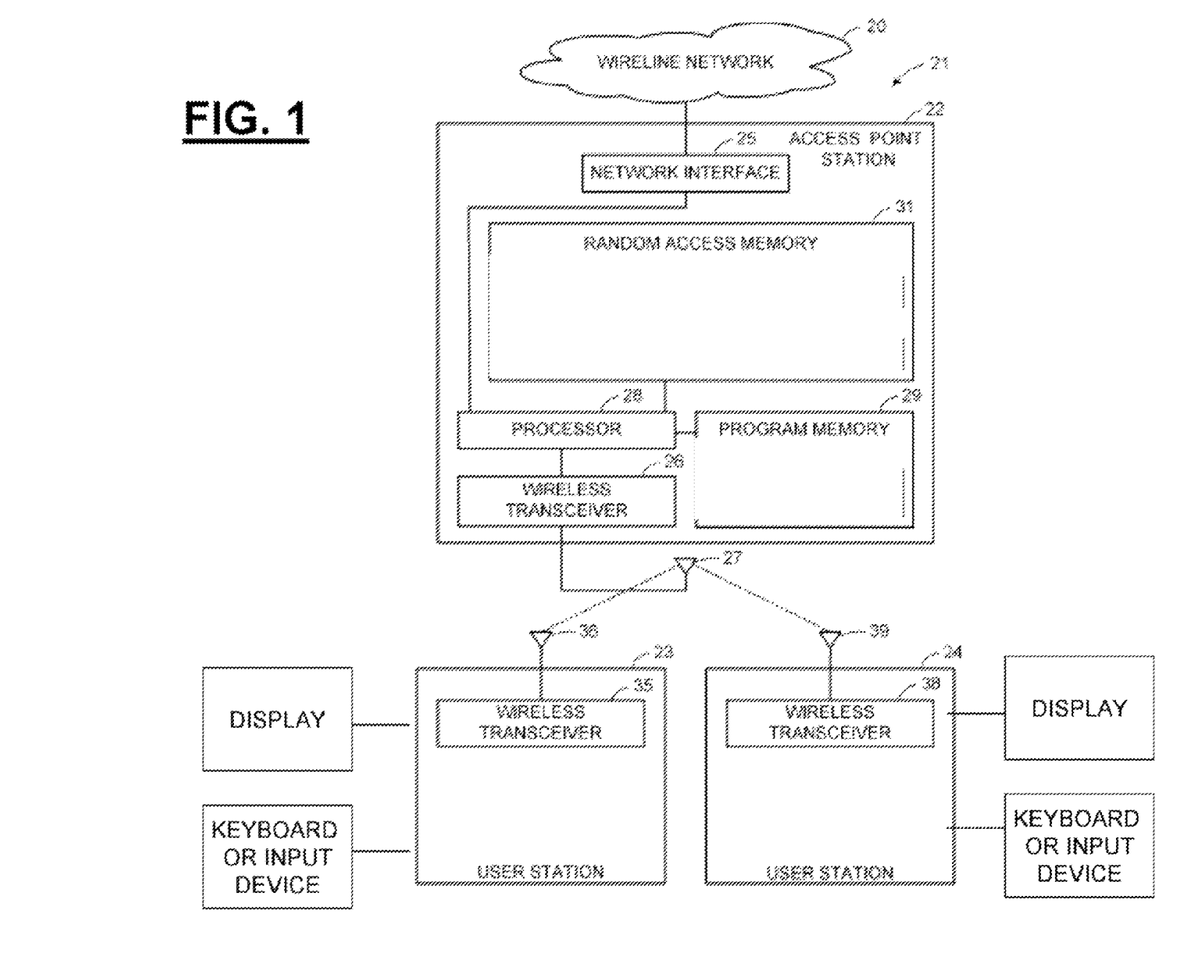
FIG. 1 depicts some illustrative architectural components that can be employed in some illustrative and non-limiting implementations including wireless access points to which client devices communicate.

FIG. 1 depicts some illustrative architectural components that can be employed in some illustrative and non-limiting implementations including wireless access points to which client devices communicate. In this regard, FIG. 1 shows an illustrative wireline network 20 connected to a wireless local area network (WLAN) generally designated 21. The WLAN 21 includes an access point (AP) 22 and a number of user stations 23, 24. For example, the wireline network 20 can include the Internet or a corporate data processing network. For example, the access point 22 can be a wireless router, and the user stations 23, 24 can be, e.g., portable computers, personal desk-top computers, PDAs, portable voice-over-IP telephones and/or other devices. The access point 22 has a network interface 25 linked to the wireline network 20, and a wireless transceiver in communication with the user stations 23, 24. For example, the wireless transceiver 26 can include an antenna 27 for radio or microwave frequency communication with the user stations 23, 24. The access point 22 also has a processor 28, a program memory 29, and a random access memory 31. The user station 23 has a wireless transceiver 35 including an antenna 36 for communication with the access point 22. In a similar fashion, the user station 24 has a wireless transceiver 38 and an antenna 39 for communication to the access point 22. By way of example, in some embodiments an authenticator could be employed within such an access point (AP) and/or a supplicant or peer could be employed within a mobile node or user station.

Figure 2:
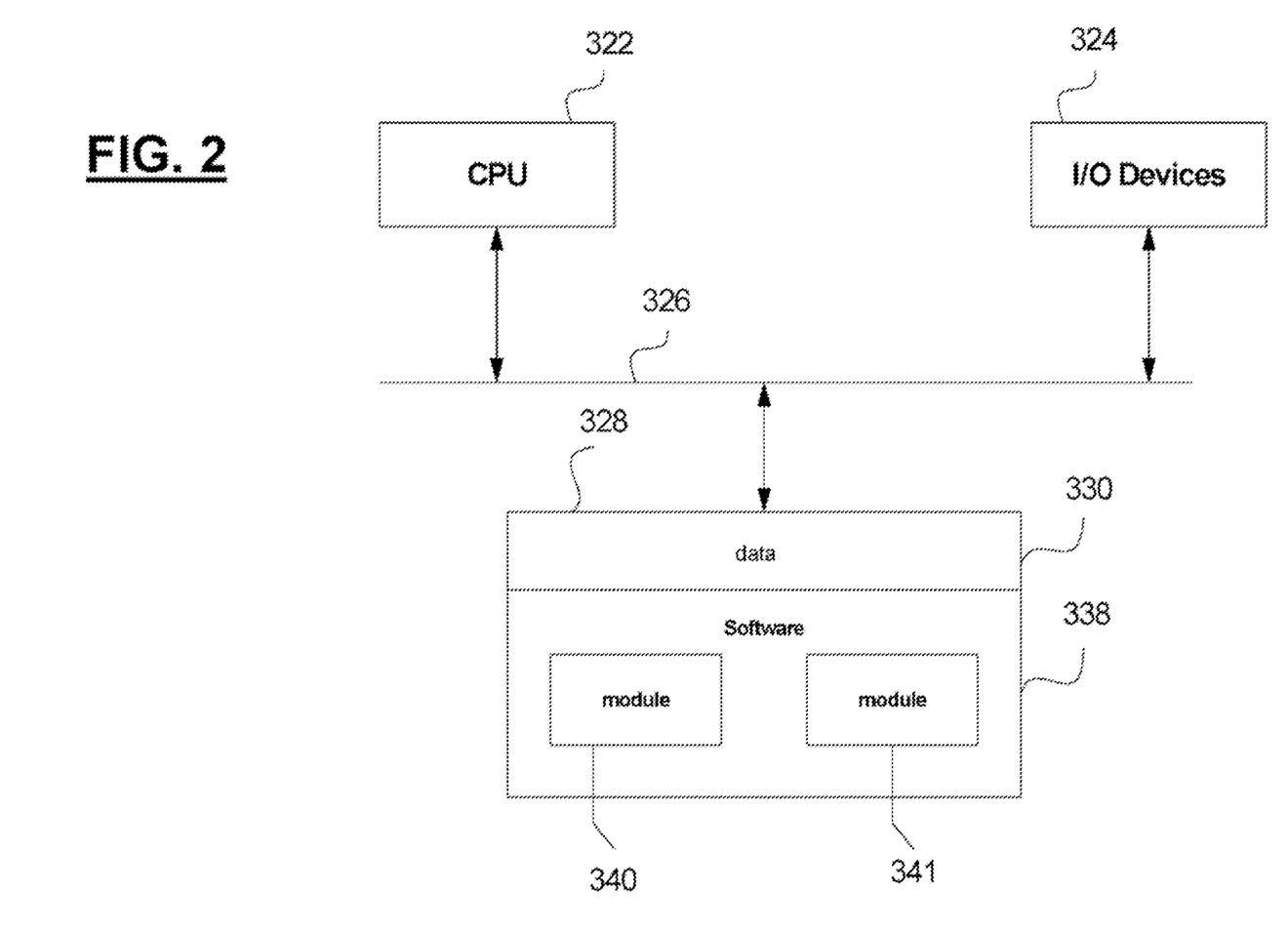
FIG. 2 shows an illustrative computer or control unit that can be used to implement computerized process steps, to be carried out by devices, such as, e.g., an access point and/or a user station, in some embodiments of the invention.

FIG. 2 shows an illustrative computer or control unit that can be used to implement computerized process steps, to be carried out by devices, such as, e.g., an access point and/or a user station, in some embodiments of the invention. In some embodiments, the computer or control unit includes a central processing unit (CPU) 322, which can communicate with a set of input/output (I/O) device(s) 324 over a bus 326. The I/O devices 324 can include, for example, a keyboard, monitor, and/or other devices. The CPU 322 can communicate with a computer readable medium (e.g., conventional volatile or non-volatile data storage devices) 328 (hereafter "memory 328") over the bus 326. The interaction between a CPU 322, I/O devices 324, a bus 326, and a memory 328 can be like that known in the art. Memory 328 can include, e.g., data 330. The memory 328 can also store software 338. The software 338 can include a number of modules 340 and 341 for implementing the steps of processes. Conventional programming techniques may be used to implement these modules. Memory 328 can also store the above and/or other data file(s). In some embodiments, the various methods described herein may be implemented via a computer program product for use with a computer system. This implementation may, for example, include a series of computer instructions fixed on a computer readable medium (e.g., a diskette, a CD-ROM, ROM or the like) or transmittable to a computer system via and interface device, such as a modem or the like. A communication medium may be substantially tangible (e.g., communication lines) and/or substantially intangible (e.g., wireless media using microwave, light, infrared, etc.). The computer instructions can be written in various programming languages and/or can be stored in memory device(s), such as semiconductor devices (e.g., chips or circuits), magnetic devices, optical devices, and/or other memory devices. In the various embodiments, the transmission may use any appropriate communications technology.

Discussion of the Preferred Embodiments

In the public WLAN systems, reliable user re-authentication for mobility support is an essential step. However, re-authentication during handoff procedures causes long handoff latency which deteriorates the quality of service specifically for real-time multimedia applications. One possible solution is to authenticate the Mobile Node (MN) in advance with all the neighboring Access Points (APs) and distribute the Session Keys to them. However, a key issue is how to optimally and efficiently select the neighboring APs. In this application, a system is presented that, e.g., takes into account the user current "Geo-Location", "Mobility Pattern" and "Application Running on MN"; estimates the "Expected Mobility Zone" (EMZ) and selects an appropriate set of candidate APs corresponding to the MN's geo-location. The EMZ may comprise, e.g., APs belonging to "Intra-domain", "Inter-domain", or "Inter-technology Networks" (e.g., WLAN, WiMAX, and Cellular, etc).

In the preferred embodiments, the system recognizes that not only the Mobile Nodes but also the Fixed Nodes (e.g., APs or Base Stations) can be capable of knowing their Geo-Location Coordinates X, Y, Z. This capability can come either by, e.g., integrating a GPS receiver and/or through any other alternate, state of the art or future positioning technologies in the APs.

Introduction

User mobility in wireless data networks is increasing because of the popularity of portable devices and the desire for voice and multimedia applications. Furthermore, WLANs that were originally designed for indoor network solutions, such as convention centers, airports, shopping malls, and so on, are becoming equally popular in outdoor applications, thus, demanding support for different user mobility patterns. These phenomena require fast handoffs among, e.g., APs and/or Base Stations to maintain the quality of the connections. Re-authentication during handoff procedures causes a long handoff latency which affects the flow and service quality especially for multimedia applications. Therefore, minimizing re-authentication latency is crucial in order to support real-time multimedia applications on public wireless IP networks.

Generally, user authentication should be performed at each Access Point (AP), and if a Mobile Node (MN) moves into the coverage area of a new AP, it should again perform user authentication procedure and receive a new Wired Equivalent Privacy (WEP) key, which encrypts the transmitted data in the wireless link. This requires a MN to be authenticated during and after handoff, and consequently demands the authentication mechanisms to be responsive to the handoff time-scale required in micro-mobility environments. However, since Authentication, Authorizing, and Accounting (AAA) servers are located at locations far away from the AP, the handoff system based on the current AAA protocols cannot meet such requirements, such as, e.g., specifically for real-time multimedia applications. This impacts, among other things, network performance, device performance, and quality of service. A significant focus is placed in standard forums and research institutes to address this issue.

Recently, an IEEE Technical Group "TGi" has begun focusing on security architecture and defining 802.1x standard. The security architecture is broadly divided into two categories: (i) Encapsulation protocols for encrypting the data packets; and (ii) Key Management Protocols for secure distribution of the keying data from AP to MN for network-to-client authentication, utilizing EAP (Extensible Authentication Protocol). The IEEE "TGf", on the other hand, is focusing on the standardization of Inter-Access Point Protocol (IAPP), a protocol for context transfer between APs during inter-AP handoff, located within the same subnet. However, latency caused by both, 802.1x and IAPP message delivery is unavoidable in handoff.

A review of literature reveals that there may be other methodologies that support handoff between two APs, belonging to the same subnets only. However, these methodologies still do not meet the requirements imposed by real-time multimedia applications because of, e.g., the long handoff delays. To overcome these drawbacks, one method proposes a fast handover system based on context transfer. It essentially reduces connectivity and reception latency, because it allows MN to configure a new IP address and notify the new access router (AR) of the new IP address, even before it connects to its new AR. Thus, the access router sets up a suitable forwarding path for the packets destined for the MN's previous IP address, in this system, the forwarding path from the previous AR to the new AR must not be enabled until the mobile host explicitly authorizes the previous AR to do so. Therefore, the mobile host sends this indication using a "Fast" Mobile IPv6 Binding Update message to the previous AR only after receiving this information, and, it starts forwarding the packets on the tunnel established earlier. Although the fast handover system of that system can reduce connectivity and reception latencies, it requires link layer triggers to support the functions, and thus is dependent on link layer technologies.

Fast handoff using Explicit Multicast (XCAST), has also been proposed, which is another system for handling real-time applications in WEANS. XCAST has no unique multicast group address, but uses the unicast address of the group members to route packets. The unicast address is inserted into the XCAST header and then the packets are delivered to the specified hosts. The XCAST capable routers process XCAST headers, and relay packets, depending upon the routing table entries. In this latter system, the layer 2 trigger takes place before re-association. First, either the old AP; or the MN initiates an XCAST join message with the new AP's IP address. Once re-association is performed, then the new AP sends a re-association complete message to the XCAST capable access router, and the XCAST router removes the old AP's IP address from the MN's XCAST entry, During handoff, the XCAST capable access router duplicates packets and sends them over the distributed system to both of the APs listed in the XCAST table. This system can provide fast and smooth handoffs, but it does not involve user authentication. Therefore, it is not a secure mechanism. Furthermore, it requires access routers with XCAST capability.

One of the ideas to minimize the re-authentication latency is to have a system in which, when a MN sends an authentication request, the AAA server authenticates not only the currently used AP, but also multiple other APs, and sends multiple WEP keys to the MN. However, the key issue is how to optimally and efficiently select the appropriate set of APs. The present invention, among other things, addresses this issue.

In preferred embodiments of the present invention, the present system a) takes into account the user current "Geo-Location Coordinates (Xmn, Ymn, Zmn)", "Mobility Pattern (the manner Xmn, Ymn, Zmn are changing)", "User Application (application running on the user device)", and "User Preference Based on User Policy", b) estimates the EMZ (Expected Mobility Zone) and c) selects an appropriate set of candidate APs that fall in that EMZ. The APs are selected based on the Geo-Location Co-ordinates of the APs "Xap, Yap, Zap" corresponding to the geo-coordinates of the MN.

In the preferred embodiments, other important issues pertaining to user authentication for inter-domain and inter-technology handoff are also addressed. The preferred embodiments provide fast re-authentication between AP of homogeneous networks as well as heterogeneous networks (e.g., WLAN, WiMAX, and Cellular). Thus, in the preferred embodiments, the complete architecture not only provides a comprehensive solution, but several other advantages. By way of example:

a) The preferred embodiments are capable of offering a complete architecture for intra-domain, inter-domain, and inter-technology networks via domain level, network level, and inter-network level Location Configuration Servers (LCSs).

b) The preferred embodiments are capable of providing a well managed architecture harnessed to facilitate fast hand-off without MNs' solicitations or pre-service negotiations. The MNs only have to send their Geo-Location Coordinates (GLC) periodically, or information about users policy that is local in the MN and is not included in subscription profile saved in the network. This saves time and energy, e.g., battery life, for the MN; and reduces the signaling burden for the Network.

c) In the preferred embodiments, the services can be offered by a network without advertising or broadcasting its capabilities. This also saves network resources.

d) Preferred embodiments can be capable of providing session keys in advance to the candidate APs based on several real situations for example whether or not MN's Current Application needs such special treatment, whether a user is mobile or stationary, and finally whether or not the proactive key distribution is provisioned in the User's policy.

e) In preferred embodiments of the present system, the EAP peers know where the keys are distributed and thus can use this knowledge in making handover decisions.

f) In preferred embodiments of the present system, the LCSs do not have to interact with MN or mobile clients directly; thus the IP addresses of these LCSs are only known internally. Accordingly the proposed system is less prone to security risks. It is worth mentioning that the LCS does not have to interact with the MN directly but can still act as MN's proxy to conduct dialogue with AAA. This authority/policy, if provisioned in the users subscription profile, is communicated by the AP to LCS.

g) In preferred embodiments of the present system, the LCSs act as a proxy from MN side and communicate with AAA on behalf of MN, thus AAA does not have to send unsolicited messages, but rather, sends messages at the request of LCSs. This eliminates the security issues noted in RFC 3576.

In some of the preferred embodiments, the system recognizes that in the future not only the mobile nodes but also the fixed nodes (Access Points or Base Stations) will be GPS enabled. As an alternative, GLC can be manually fed-in/memorized to the fixed nodes (Access Points or Base Stations) by a network administrator e.g., by using a standalone professional (high sensitivity) GPS receivers that can be attached to each fixed node temporarily for determining and calibrating GLC of each AP.

Detailed Description Of Proposed Techniques

Figure 3:
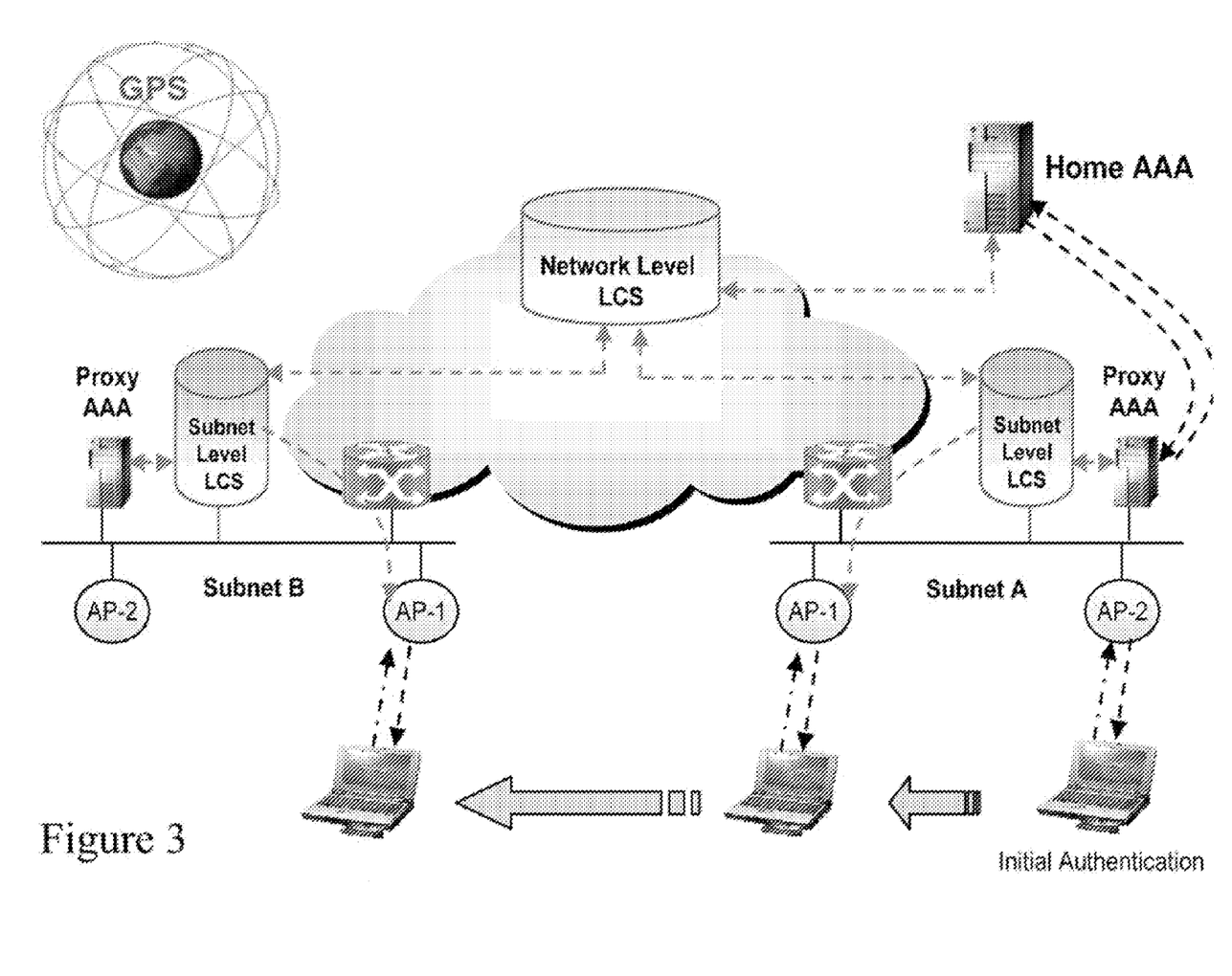
FIG. 3 is an architectural diagram showing geo location based key distribution according to some of the preferred embodiments.
Figure 4:
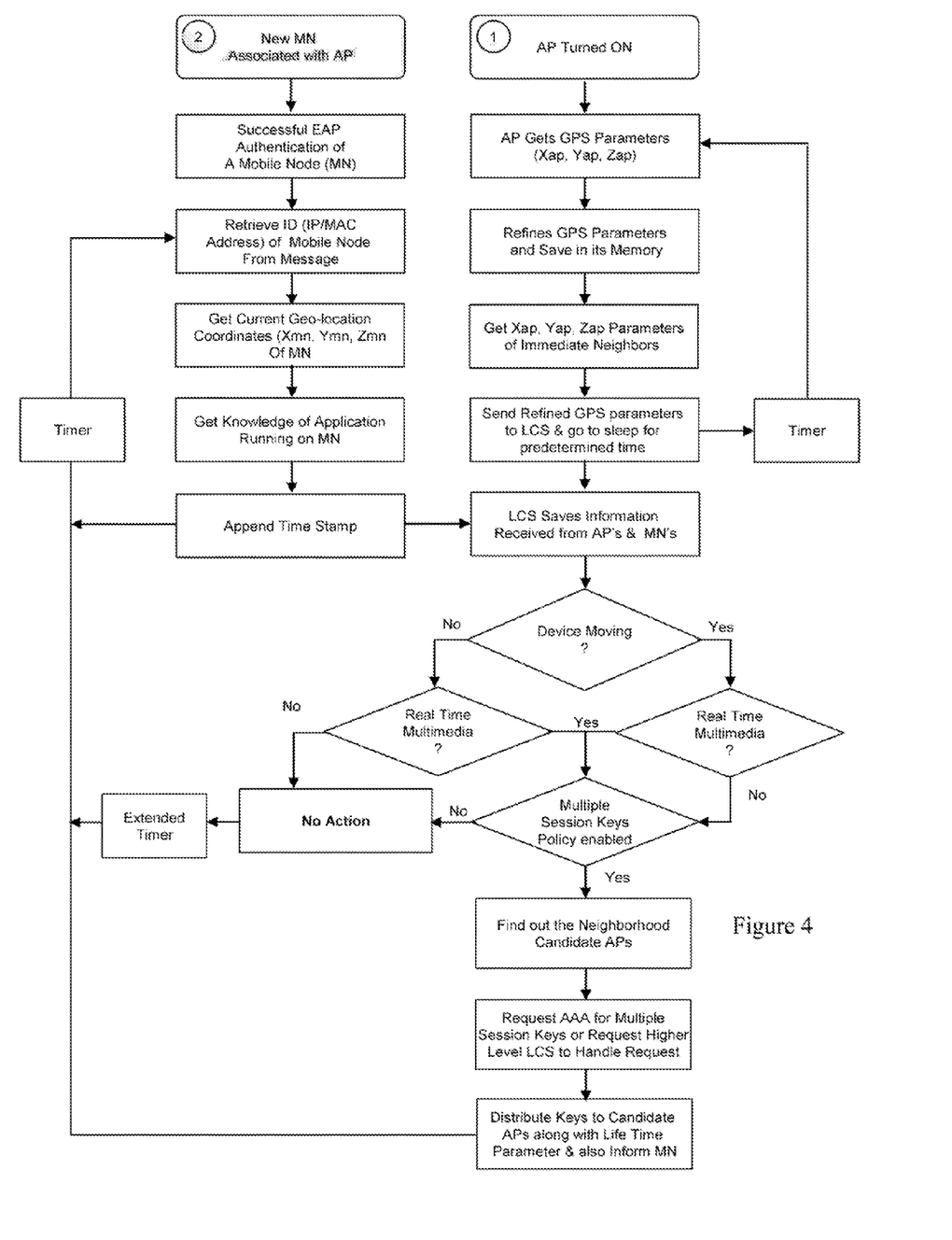
FIG. 4 is a flow diagram showing functionalities of Location Control Servers for Geo Location Based Session Key Distribution according to some of the preferred embodiments.

In the preferred embodiments, the proposed system minimizes the latency caused by re-authentication procedures at the new APs to promote fast handoff. According to the proposed system, MN, at the time of initial registration, is authenticated for association with the current AP as per established standard procedures; however, re-authentication is facilitated by the newly introduced entity called LCS, if allowed by the MN in its subscription profile. For the preferred embodiments, the overall concept is shown in FIG. 3 and the preferred algorithm is shown in FIG. 4. In the preferred embodiments, the proposed methodology:
(i) Determines Mobility Pattern based on GLC periodically received from the MN
(ii) Portrays "Expected Mobility Zone (EMZ)", and select Multiple APs that fall that zone,
(iii) Distributes the session keys to the multiple APs belonging to the EMZ, and informs MN accordingly.

Determination of Mobility Pattern Based on Geo-Location Coordinates

In order to determine the Mobility Pattern based on GLC, it is assumed that:
(a) Each Mobile Device is capable of knowing its own geo-location coordinates (Xmn, Ymn, Zmn), and
(b) Similarly, each AP (of e.g. WLAN, WiMAX, Cellular, Bluetooth, or any other access technology) is capable of knowing its own geo-location coordinates (Xap, Yap, and Zap).

This capability can be incorporated in both APs and MNs either by integrating "GPS" or any other existing or future positioning technology. Literature survey shows that substantial work has been done not only to enhance existing GPS precision but also to develop new alternative location solutions. The findings are broadly categorized into three groups;
a) Technologies focusing on GPS System Enhancement,
b) Technologies focusing on Cellular networks, and
c) Hybrid of above noted technologies.

Enhancement of overall GPS System includes enhancements in the RF front end, GPS receiver dynamics and computational solutions to achieve high-sensitivity GPS.

Development of technologies focusing on cellular infrastructure and work exactly in the same way as the GPS, wherein triangulation is done by three or four base-stations. The systems are quite accurate, however, like GPS; their accuracy is also dependent on the coverage area.

Development of Hybrid Systems, where Cellular Networks are used to assist GPS receivers, either to enhance the signal or reduce the computational load on the receiver. These systems may comprise of A-GPS (Assisted-GPS) or Differential Services Solutions. These solutions improve substantially the weak signal acquisition and tracking with aiding information provided by cellular networks.

To make APs capable of knowing their own geo-location coordinates (Xap, Yap, and Zap), the AP is equipped with a GPS receiver (or any other state of the art technology receiver). Thus Geo-coordinates Xap, Yap, and Zap, are determined, saved in each AP, and communicated to the LCS automatically. Since APs are fixed nodes once they have determined (Xap, Yap, and Zap), saved the coordinates in their memory, and communicated to the LCS, they can go for predetermined long sleeps. Thus, from an operation point of view, the location receiver installed in the AP can be programmed in such a way that whenever the AP is turned on from the off position, its GPS receiver turns on for an extended period, e.g. one week time period or so. It may then go for a permanent long sleep or it can wakeup at some predetermined times, e.g. once a month or so, and run for a couple of days for location fine tunings. Furthermore, from an implementation point of view, an AP equipped with a Location receiver, can be provided with specific software that, over the period of time, can identify and separate LOS signals from multipaths, nullify Doppler Effects, analyze their magnitudes, and model these effects for superior receiver performance.

The second alternative to make APs capable of knowing their own geo-location coordinates (Xap, Yap, and Zap) is by using a standalone GPS Receiver that can be attached to each AP temporarily for determining and calibrating its location coordinates. For this purpose a professional GPS receiver can be used. The location coordinates so obtained correspond to the location of that AP to which GPS receiver is attached. The geo-coordinates can be manually fed-in/memorized to that AP by a network administrator for each AP installed in the network. The process can be repeated for reliability if the need is felt. Once the precise location of AP is determined, it is stored in the memory of AP. The AP communicates its location to LCS.

For the first option, that of APs equipped with GPS receivers, it is noted that GPS receivers in motion are subject to certain constraints that Fixed APs are not. Some of the constraints include, experiencing quick high and low fades in short coherence times, and the need to have at least four independent measurements within a given time span. The reacquisition time needed for the receiver to lock back on the satellite's signal after the signal was unavailable for a certain time period is an important indicator of the quality of service provided by the GPS receiver. The reason behind this is that a GPS receiver in a stationary AP can get the repeated GPS signals (each 30 second period of data re-appears almost identically) for extended period of times from the same fixed location. It can fine tune its location whenever signals from more satellites become available.

Determination of Expected Mobility Zone and Selection of Multiple APs in the EMZ The MN, after initial registration, with the current AP as per established standard procedures, conveys its own GLC information to LCS periodically based on which LCS determines the EMZ. The periodicity of sending GLC information may be either predetermined, or it may be made a function of MN's speed (i.e., how fast Xmn, Ymn, and Zmn coordinates are changing) and application (e.g. real time or non-real time) running on the MN. The EMZ for a particular MN comprises those APs that are in the geo-range of that MN, and that MN is likely to move to in the near future. The LCS can narrow down the list of candidate APs by eliminating those which may lie in the geo-range of MN but may not be suitable candidates. For example, if two APs are installed at two different levels of a building, or two APs are installed at two opposite banks of a lake, users may not move from one AP to another AP frequently along those paths. To build such intelligence in LCSs, terrain maps, or buildings layout maps etc, can be saved in the LCSs. The LCSs can also make a log of handover patterns, and learn from those patterns over the time thus making smart decisions accordingly.

Distribution of Session Keys to the APs Belonging to EMZ

After down-selecting the list of qualified APs, the next step is to distribute the session keys to them. Additionally, the IDs of those that qualify for receiving authentication keys for any specific MN must be transmitted to that MN.

Looking now to FIG. 3, a mobile node (MN) is shown moving from one access point (AP) to another in subnet A, and continuing on to subnet B. The MN associates itself with AP-2, where it gets authenticated/authorized by proxy AAA, or Home AAA in the case of roaming, as per established IEEE protocols. In IEEE 802.1x, there is the controlled port and the uncontrolled port. The controlled port is used for date transmission, and the uncontrolled port is used for transmission of the "Access-Request" and "Access-Reply" messages. A mobile host can obtain access to the controlled port only after performing the user authentication and receiving session and WEP keys. User Authentication is provided by the AAA Server. Frequently, the AAA server is located in a remote domain for more scalable service. This causes a delay in the path from the AP to the AAA server. The delay is a critical factor in the total handoff latency.

According to the preferred embodiments, once the MN gets authenticated/authorized by the AAA, the AP (to which the MN gets associated to) informs LCS about MN's ID. LCS collects and maps the GLC information and users policy information unicast by MN and records it. Based on the collected information, LCS will determine EMZ, short list candidate APs list and, on behalf of the MN, will contact the proxy AAA (if there is none in that domain, LCS forwards it to the higher level LCS), and request for multiple session keys for the short-listed multiple APs that fall in the estimated EMZ. After successfully getting the session keys, and mapping them with IDs of APs (to which these keys are to be issued) LCS will distribute them to the candidate APs and inform MN accordingly. (Thus, the MN will not be ignorant of where the keys have been distributed and can use this knowledge in handoff decisions). In this system, since a set of APs has already received the keys from the LCS and an authenticated MN also has the knowledge of these keys, the MN can obtain access to the controlled port for data transmission without further re-authentication. All of these functions can be implemented by using various attributes available in the current AAA protocol.

It is worth mentioning here that "Access Request"/"Access Reply" messages to and from the LCS are based on AAA protocols being used, such as RADIUS, Diameter, etc. However, in the preferred system, the session keys are received by LCS and distributed to the short-listed candidate APs instead of just one AP as depicted in FIG. 3, where a mobile host sends only one access request through the current AP to the AAA.

A preferred algorithm is shown in FIG. 4. The algorithm is triggered by two events: (i) when an AP is turned ON; and (ii) when a new MN associates itself with an AP. When an AP is turned on, it receives Geo location coordinates, refines them, and sends them to the LCS along with its own ID. In the due course, it receives knowledge of its immediate neighbors geo-location coordinates and sends them too to LCS. This algorithm is timed and runs after some predetermined time.

When a new MN gets associated with an AP, it is authenticated as per prevailing standards. Once it is authenticated, the LCS gets the ID of MN and the following information based on which it decides if it needs special treatment to execute fast hand-off:

1. Users' Applications: Some users may be running real time multimedia applications (VoiP, Streaming Video etc) and may want seamless connectivity without data loss during handover. Some others may tolerate session disconnection occurring during handoff and may be willing to re-connect to WLAN by means of new initiation procedures. Accordingly, neighboring APs pre-authentication may not be required. The knowledge about user application can be acquired either from the AP with which the MN is associated, or from the MN, if it needs special treatment for handovers. The MN itself can provide information about its application.
2. Moving Pattern: According to an embodiment of the present invention, the MN periodically sends its location coordinates to the LCS. From this information, the LCS figures out the moving pattern of the MN. Based on the moving pattern, the LCS determines the best subset of the candidate APs. Some users may move from one AP to another more frequently than others. Furthermore some users move around faster than others. To support those users whose movement frequency and moving velocity are high, a higher number of neighboring APs are included in EMZ. The knowledge of moving pattern can be acquired from Xmn, Ymn, and Zmn changes, and how rapidly they change. The periodicity can be based on the speed with which MSN is moving and/or the application that is running on the MN.
3. Users subscription policy must be checked, if the user has agreed for such service provisioning. This can be performed by the AP when the user is first authenticated and authorized by the AP with which an MN is associated.

If the algorithm decides that the MN needs special treatment to execute fast hand offs, the LCS finds out the neighborhood candidate AP from the (i) GLC parameters of MN (Xmn, Ymn, Zmn) and how rapidly they are changing, (ii) Finding APs with GLC (Xap, Yap, Zap) corresponding to Xmn, Ymn, Zmn, (Note APs' ID, their GLCs, the GLCs of their neighbors, terrain maps, or buildings layout maps etc are already reported by APs and stored in the database of LCS), (iii) down select the appropriate APs, according the user's policy and communicates with proxy AAA Server or Home AAA server on behalf of MN. It gets multiple session keys, and distribute the keys to the candidate APs under the intimation of MN. If a candidate AP is determined by the LCS to be in some other domain, the LCS of one domain authorizes the LCS of the other domain (through higher layer LCS) to get session keys from the AAA/proxy AAA serving that domain and deliver them to the candidate AP in that domain. Since higher level LCSs also have the gateway capabilities, they can communicate with the LCS of other Networks.

The LCSs are trusted network Nodes. These nodes talk to each other internally (e.g., do not communicate directly with external elements, such as, e.g. MN), and hence are less prone to security attacks. These Nodes have internal IP addresses that can either be statically or dynamically assigned. These are private and not visible externally and thus offer added and robust security. The AP that plays the controlling rote has a special capability of talking to LCS without jeopardizing MN's security. Moreover, the algorithm of the preferred embodiments comes into effect once the MN gets authorized and authenticated. This further eliminates the security risks. In an embodiment of the present invention, AP can authorize LCS for this service provisioning after confirming MN's credentials from AAA. MN's credentials can be upgraded/modified catering for user's desire for better QoS during handoff by enabling the Multiple Session Keys Distribution Policy.

All the candidate APs, except the current AP with which the MN is currently associated, will preserve this authentication information temporarily for some pre-determined period as indicated by the Life Time Parameter and if no handoff events within that specific time period, occur, they will delete this key information.

Preferred Tasks Performed by LCSs

In the preferred embodiments, an LCS is provided that is a server computer that is configured to perform the following tasks.

1. LCS is capable of receiving ID (i.e., IP/MAC address etc.) and the geo-coordinates (i.e. Xap, Yap, Zap) of each existing or new AP in the network. It is also capable of storing this information.
2. LCS is capable of receiving ID (i.e. IP/MAC address etc.) and the geo-coordinates (i.e. Xmn, Ymn, Zmn) of each MN associated (registered/authenticated) with each AP in the network. LCS may receive the information from the AP to which MN is associated.
3. LCS is also capable of receiving user's policy for down selecting the candidate APs. This maybe received from either MN or subscription database i.e. AAA.
4. LCS is also capable of mapping geo-coordinates of MN, with MN's ID and saving them at least for the duration of the time the MN is registered in the network.
5. LCS is capable of analyzing the changes in GLC, received periodically from the MN through AP and based on the analysis capable of determining the candidate set of neighborhood APs.
6. LCS is capable of communicating AAA/proxy AAA on behalf of a MN, getting multiple session keys, distributing those session keys to the candidate APs and informing MN.
7. LCS will be capable of getting, from its own database, the IP address of other LCSs or the IP address of AAA servers in other domains or other inter-working networks. Thus LCS also has the capability of Gateways to communicate with the entities of other networks.

In addition to the above tasks, in the preferred embodiments, the LCS is also configured to perform the following tasks that can be utilized for location services:

8. Transforming the Xmn, Ymn, and Zmn coordinates into civic address. In case of a building, the altitude (i.e. Zm) may be transformed in terms of floor indication, as it may be more useful. For this the LCS, may be loaded with digital street maps and/or geological survey maps.
9. LCS is capable sending the location information (corresponding to Amn, Ymn, Zmn) to the MN in the format required by the MN. LCS is also capable of storing the information in any format (e.g., binary, or text) and converting or translating it into any desired format (text or binary). MN without maps can enquire of the LCS about their civic location information. Getting this information will be beneficial for all those user applications which require the location data to be available at bearer plane instead of signaling plane. This may be supplied to the MN in user or machine readable, or both formats as per users' preference. This can make the MN not only a powerful navigational toot, but also open several location based applications.

Other Embodiments

In some other embodiments of present invention, an AP may broadcast its own (and neighboring APs geo-location coordinates-IEEE 802.11r enables neighboring APs to communicate). And, the MN can compare its own geo-coordinates with that of the AP to which it is associated and to neighboring APs, and if moving, can make faster and better hand-off decisions.

In another embodiment of the present invention, a time stamp can also be appended when the mobile performs registration and associates itself to a particular GAP. This can be useful in measuring the speed of the mobile device.

Illustrative Advantages

In some embodiments a Transparent QoS Service Provisioning by the Network can be achieved—e.g., the Mobile Node does not have to solicit, or set up pre-service dialogue for this service. This can save time and energy (battery life) that might have been spent in service and parameters negotiation for pre-authentication etc.

In some embodiments, a low signaling burden on network can be achieved—e.g., the service can be offered without service parameters negotiation and it can reduce enormous amount of signaling traffic on the network.

In addition, in some embodiments, the service can be offered by network without advertising or broadcasting its capabilities thus saving network resources.

In addition, in some embodiments, the LCSs talk to each other internally thus are less prone to security attacks from external entities.

In some embodiments, the solution may be advantageous to those applications that require location information within the session establishment request e.g. location based routing, least cost routing, or check for roaming restrictions.

In some embodiments, the AP can include its own geo-coordinates in its service set identifier (SSID) thus each AP can have a unique ID. This can solve several problems that today's AP face because they do not have unique IDs.

Moreover, in some embodiments, the network operators can better manage their Assets (i.e. AP and networks).

Broad Scope of the Invention

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims (e.g., including those to be later added) are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example".

What is claimed is:

1. A method, comprising
at least one location configuration server periodically receiving the mobile node's geo location coordinates information from the mobile node,
said location configuration server determining the expected mobility zone for said mobile node based on said geo location coordinates periodically received from said mobile node,
wherein said location configuration server distributes session keys to a plurality of access points that are within said expected mobility zone and distributes said session keys to said mobile node, each session key being mapped with an ID of the access point within said expected mobility zone to which the key is issued, and
wherein the periodicity of receiving geo location coordinates is a function of at least one of how fast the coordinates of said mobile node are changing and the applications running on said mobile node.

2. The method of claim 1, wherein said location configuration server selects a plurality of access points that are within said expected mobility zone.

3. The method of claim 2, wherein said plurality of access points belong to an intra-domain and inter-domain, or inter-technology networks.

4. The method of claim 1, wherein a mobile node establishes an initial registration with its current access point prior to said location configuration server periodically receiving said geo location coordinates information.

5. The method of claim 1, wherein the expected mobility zone for said mobile node comprises those access points that are in the geo-range of said mobile node, and access points that said mobile node is likely to move to in the near future.

6. An apparatus for determining the mobility pattern for at least one mobile node having a geo location member and being programmed to generate its geo location coordinates and transmit said geo location coordinates to a location configuration server, comprising:
a location configuration server including a server computer configured to receive and store said geo location coordinates of each existing or new access point in the network, to receive and store transmitted said geo location coordinates from each of said at least one mobile nodes, and being programmed to calculate the expected mobility zone for each of said at least one mobile node based on said geo location coordinates periodically received from each of said at least one mobile node, and
wherein said location configuration server is programmed to select a plurality of access points that are within the expected mobility zone of each of said at least one mobile node, to distribute session keys to said selected plurality of access points, and to distribute said session keys to each of said at least one mobile node, each session key distributed to each of said at least one mobile node being mapped with an ID of the access point within said expected mobility zone to which the session key is issued.

7. The apparatus of claim 6, wherein each of said at least one mobile node is authenticated when it establishes an initial registration with its current access point prior to periodically conveying its geo location coordinates information to the location configuration server that determines the expected mobility zone, and wherein an authenticated mobile node obtains access to the controlled port for data transmission of an access point within said expected mobility zone without re-authentication.

8. The apparatus of claim 6, wherein each of said at least one mobile node has a computer processor for determining a periodicity for sending geo location coordinates as a function of at least one of how fast the coordinates for each of said at least one mobile node are changing and applications running on each of said at least one mobile node and wherein said location configuration server has a memory storage member, said memory storage member receiving and storing data, said data comprising the frequency of each of said at least one mobile node traveling along a particular path between specific geo locations.

9. A system, comprising:
at least one location configuration server, each of said at least one location configuration server having a computer, said computer being programmed with an algorithm for calculating an expected mobility zone for a particular mobile node, said expected mobility zone comprising access points that are in the geo-range of said particular mobile node, and access points that the mobile node is likely to move to in the near future, and
said location configuration server being configured to send said mobile node session keys for access points within its Expected Mobility Zone, said session keys being mapped with IDs of access points to which keys are issued and providing access to an access point controlled port for data transmission without further re-authentication.

10. The system of claim 9, wherein said location configuration server stores and maps geo location coordinates information transmitted by the mobile node.

11. The system of claim 10, wherein said location configuration server stores user policy information relating to the need for seamless connectivity without data loss during handover.

12. A location configuration server for providing fast re-authentication of mobile nodes between access points, comprising:
said location configuration server being configured to receive IDs and geo-coordinates of a plurality of access points within a network;
said location configuration server being configured to receive IDs and geo-coordinates of mobile nodes associated with said plurality of access points within the network;
said location configuration server being configured to receive mobile node user policies for down-selecting of candidate access points of said access points within the network;
said location configuration server being configured to map geo-coordinates of said mobile nodes with IDs of said mobile nodes, and saving them for at least a duration of time the mobile node is registered within the network;
said location configuration server being configured to analyze changes in geo-location coordinates of said mobile nodes and to determine a candidate set of plural neighborhood access points from said plurality of access points; and
said location configuration server being configured to communicate to an AAA server or a proxy AAA server on behalf of one of said mobile nodes, of obtaining multiple session keys, of distributing respective ones of said multiple session keys to respective ones of said candidate set of plural neighborhood access points, and informing said mobile node of said session keys.

13. The location configuration server of claim 12, wherein said configuration server is further configured to determine if a candidate access point is within another domain, and to receive authorization from a location configuration server of said other domain.

14. A method, comprising
at least one location configuration server periodically receiving the mobile node's geo location coordinates information from the mobile node,
said location configuration server determining the expected mobility zone for said mobile node based on said geo location coordinates periodically received from said mobile node,
wherein said location configuration server distributes session keys to a plurality of access points that are within said expected mobility zone and distributes said session keys to said mobile node, each session key being mapped with an ID of the access point within said expected mobility zone to which the key is issued,
wherein said location configuration server communicates to an AAA server or a proxy AAA server on behalf of said mobile nodes, obtains multiple session keys which each correspond to different ones of said access points, and distributes respective ones of said multiple session keys to respective ones of said access points, and informs said mobile node of said session keys corresponding to said access points.

15. A method, comprising
at least one location configuration server periodically receiving the mobile node's geo location coordinates information,
said location configuration server determining the expected mobility zone for said mobile node based on said geo location coordinates periodically received from said mobile node,
wherein said location configuration server selects a plurality of access points that are within said expected mobility zone,
wherein location configuration servers eliminate from the list of candidate access points those access points that are in the geo-range of said mobile node but are not suitable candidates, and wherein the determination of suitable candidates is based on data stored in location configuration servers,
wherein said location configuration server transmits session keys to a set of said access points so that said mobile node, having been authenticated by an authentication, authorizing and accounting server, having knowledge of said session keys, can obtain access to an access point's controlled port for data transmission, without further re-authentication; and
wherein said location configuration server communicates to an AAA server or a proxy AAA server on behalf of said mobile nodes, obtains multiple session keys which each correspond to different ones of said access points, and distributes respective ones of said multiple session keys to respective ones of said access points, and informs said mobile node of said session keys corresponding to said access points.

16. The system of claim 6, further including said location configuration server being configured to communicate to an AAA server or a proxy AAA server on behalf of said mobile node to obtain said session keys for distribution to said access points and to said mobile node.

17. The system of claim 9, further including said location configuration server being configured to communicate to an AAA server or a proxy AAA server on behalf of said mobile node to obtain said session keys for distribution to said access points and to said mobile node.

18. The method of claim 1, further including providing said location configuration server as a trusted network node that does not communicate directly to external elements, including mobile nodes.

19. The system of claim 6, wherein said location configuration server is a trusted network node that does not communicate directly to external elements, including mobile nodes.

20. The system of claim 9, wherein said location configuration server is a trusted network node that does not communicate directly to external elements, including mobile nodes.

21. The system of claim 19, wherein said location configuration server is an independent node from any access points AAA servers or proxy AAA servers.

22. The system of claim 21, wherein said location configuration server is an independent node from any access points AAA servers or proxy AAA servers.

23. The method of claim 1, further including said location configuration server obtaining said session keys on behalf of a mobile node that has already been authenticated and accessing a first access point and obtains and transmits said session keys to new access points for said first mobile node as to enable handover without further re-authentication via an AAA server after handover so as to avoid handover delay.

24. The method of claim 1, wherein if the location configuration server determines that a candidate access point is in a different new domain, it communicates to authorize the new domain to obtain session keys from a different AAA server or proxy AAA server in said new domain.

* * * * *